United States Patent [19]

Judd

[11] Patent Number: 4,901,268

[45] Date of Patent: Feb. 13, 1990

[54] MULTIPLE FUNCTION DATA PROCESSOR

[75] Inventor: James E. Judd, Maple Shade, N.J.

[73] Assignee: General Electric Company, Moorestown, N.J.

[21] Appl. No.: 234,124

[22] Filed: Aug. 19, 1988

[51] Int. Cl.$^4$ .................................................. G06F 7/38
[52] U.S. Cl. ................................... 364/745; 364/748
[58] Field of Search ............... 364/745, 748, 749, 736

[56] References Cited

U.S. PATENT DOCUMENTS

| | | | |
|---|---|---|---|
| 4,722,068 | 1/1988 | Kuroda et al. | 364/745 |
| 4,752,901 | 6/1988 | Vaughn | 364/716 |
| 4,754,412 | 6/1988 | Deering | 364/736 |
| 4,760,544 | 7/1988 | Lamb | 364/736 |
| 4,760,551 | 7/1988 | Yokomizo et al. | 364/748 |
| 4,768,160 | 8/1988 | Yokoyama | 364/745 |
| 4,823,260 | 4/1989 | Imel et al. | 364/745 |

Primary Examiner—David N. Malzahn
Attorney, Agent, or Firm—William H. Meise

[57] ABSTRACT

A data processor includes a reconfigurable arithmetic logic unit (ALU), which includes three ALU portions. One ALU portion includes two 16-bit input ports and a 16-bit output port. The other two ALU portions each include two 8-bit input ports and an 8-bit output port. A reconfigurable 16-bit register file is coupled to the inputs of the ALU portions. Switches couple carry output terminals of the second and third ALU portions to carry input terminals of the first and second ALU portions, respectively. With both switches conductive, a 32-bit ALU is formed from the three portions. With a first switch open, two independent 16-bit ALUs are formed. With the second switch open and the first closed, 24-bit mantissa, 8 bit exponent floating-point processing can be done by independent ALUs. The output of the first ALU portion loops back by a first multiplexer to a first 16-bit input of a register, and the two 8-bit outputs of the second and third ALU portions loop back by a second multiplexer to a second 16-bit input of the register. The register output couples words to be processed to the ALU portions.

10 Claims, 2 Drawing Sheets

MULTIPLE FUNCTION DATA PROCESSOR

BACKGROUND OF THE INVENTION

This invention relates to microprocessor architecture adapted for efficient operation on single-precision, multiple-precision and floating-point data.

Digital signal processors are widely used in modern systems of all types. Where processing must be accomplished on data having different numbers of bits, as for example 8, 16, or 32-bit data paths, difficulties arise in configuring the architecture to efficiently accommodate the various types of data. For example, where 8, 16, and 32-bit data is to be processed, and a portion of the data may be in floating-point form with a 24-bit mantissa and an 8-bit exponent, it is possible to use a 16-bit arithmetic logic unit (ALU) to operate on 16 bits of the data on each clock cycle, temporarily storing the carry bits until the next operating cycle. The problem with using a 16-bit microprocessor to perform 32-bit operations is that multiple clock cycles are required, thereby slowing the overall operation. The 16-bit ALU, when required to handle 8-bit data, requires preprocessing of the 8 bits to configure it to the 16-bit processing path or format. When a 24-bit mantissa together with an 8-bit exponent are to be processed, the situation using the 16-bit ALU is even worse, because the 24-bit mantissa portion of the data must be broken into two portions, thereby requiring at least two clock cycles, followed by a further clock cycle operating on the exponent.

One can use a 32-bit processor or ALU to process 32-bit signals. This has the advantage that 32 bits can be processed in a single clock cycle on each pass. However, the 32-bit ALU microprocessor requires preprocessing in order to handle both 16-bit and 8-bit signals. The 24-bit mantissa with 8-bit exponent further requires independent processing of the mantissa and exponent portions, by "unpacking", and further requires preprocessing of the mantissa portion. The preprocessing, unpacking and the like may undesirably require additional hardware, additional clock cycles, or both.

Where multiple data types such as 8, 16, and 32-bit as described above are to be handled, and the data increments are capable of being packed into groupings smaller than the largest grouping, as for example, by using a 16-bit ALU system, a further problem occurs in that successive 16-bit words representing MSB and LSB portions of a single 32-bit word must be loaded into appropriate portions of the ALU for correct processing. An ALU arrangement capable of efficiently handling various data types is desirable.

SUMMARY OF THE INVENTION

An arithmetic logic unit (ALU) is partitioned into at least three portions, each including two input ports, an output port and at least one carry terminal. The first ALU portion has N1-bit input and output ports, and the second and the third ALU portions have N2 and N3-bit input and output ports, respectively. When (N1+N2+N3)-bit words are to be processed, the three ALU portions have their carry input and output terminals coupled together to form an (N1+N2+N3)-bit ALU portion which processes the (N1+N2+N3)-bit word in one clock cycle. The N1-bit ALU portion is decoupled from the two coupled N2 and N3-bit ALU portions to handle two independent (N2+N3)-bit words at a time. The N1-bit and the N2-bit ALU portions are coupled together to handle (N1+N2)-bit mantissas while the remaining N3-bit ALU portion handles the N3-bit exponent independently. In a particular embodiment, N2=N3, and N1=N2+N3. More particularly, N1=16 bits, and N2 and N3 are 8 bits each.

DESCRIPTION OF THE INVENTION

Figure 1:
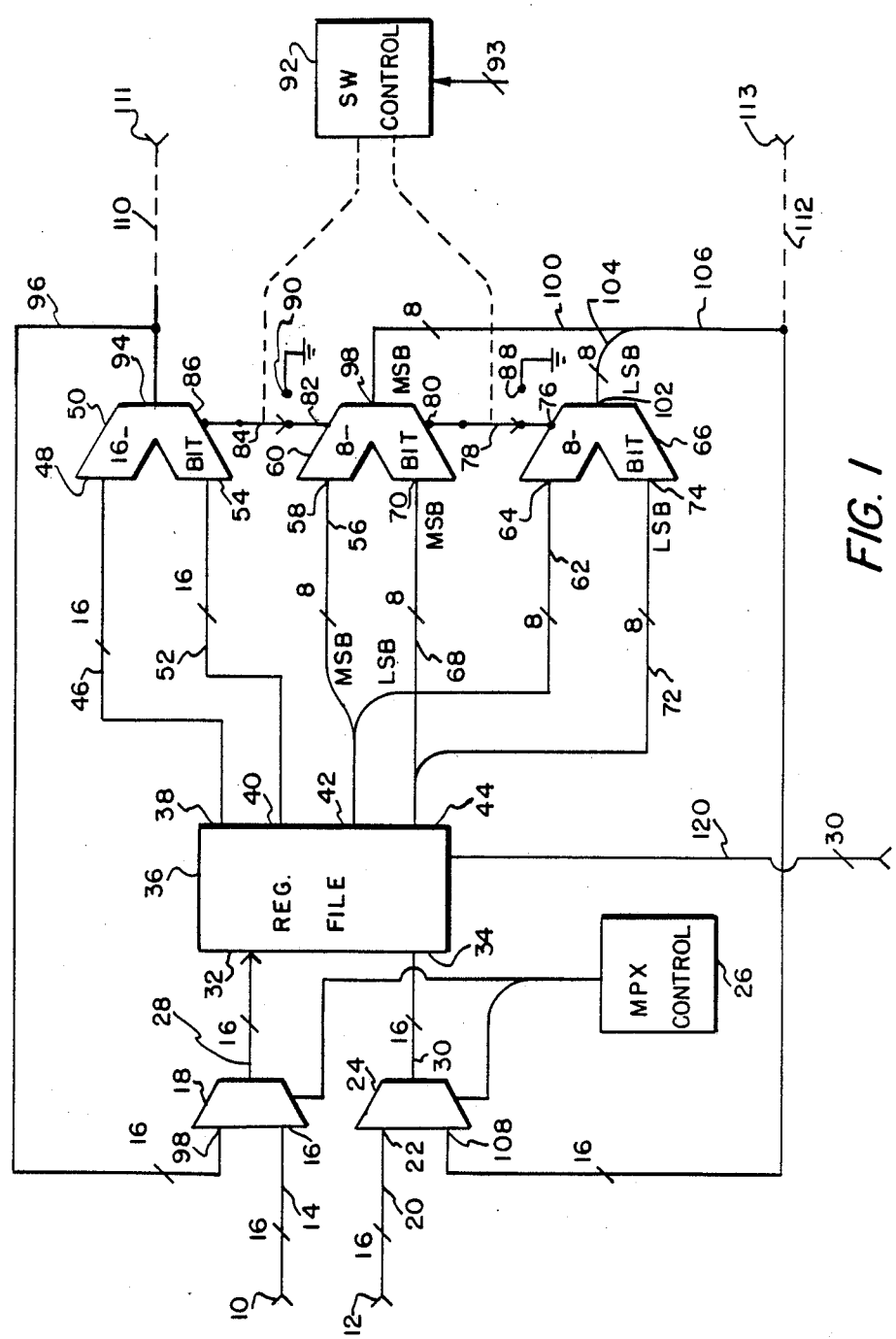
FIG. 1 is an overall block diagram of a reconfigurable processing unit in accordance with the invention.

In FIG. 1, 16-bit data or signals are applied from a source (not illustrated) to a first 16-bit input port 10 and further 16-bit signals are applied to a second 16-bit input port 12. Ports 10 and 12 are adaptable for receiving two single-precision 16-bit words, a single 32-bit double-precision word or a floating-point 24-bit mantissa together with 8-bit exponent. When the input signal is a 32-bit word, input port 10 receives the more significant portion and input 12 receives the less significant portion. When the input word is a floating point 24-bit mantissa together with an 8-bit exponent, input port 10 receives the 16 most significant bits of the mantissa, and input port 12 receives the remaining 8 least significant bits of the mantissa in its eight most significant positions and the 8-bit exponent portion in its eight least significant portions. If only a single 16-bit word is to be processed, the signal at input port 12 becomes irrelevant and is not loaded into the register file described below.

The signal applied to input port 10 is applied over a 16-bit conductor set 14 to a first input port 16 of a multiplexer 18. The signal applied to input port 12 is applied over a conductor set 20 to a first input port 22 of a multiplexer 24.

Multiplexers 18 and 24 are controlled from a multiplex control circuit 26. When signals are to be loaded, the signals applied by way of input ports 10 and 12 to input terminals 16 and 22 of multiplexers 18 and 24, respectively, are coupled from output ports of multiplexers 18 and 24 by way of conductor sets 28 and 30, respectively, to input terminals 32 and 34, respectively, of a register file 36. Register file 36 is grouping of registers, further described in conjunction with FIG. 2.

Register file 36 stores words applied to input terminals 32 and 34 under control of steering control signals applied over a conductor set 120. Register file 36 is effectively a random-access memory which provides temporary storage to facilitate the operations of the arithmetic logic units (ALUs) described below. Register file 36 has 16-bit outputs at each of ports 38, 40, 42 and 44.

Signals appearing at 16-bit output port 38 of register file 36 are applied over a conductor set 46 to the 16-bit first input port 48 of a 16-bit ALU 50. Signals appearing at output port 40 of register file 36 are applied over 16-bit conductor set 52 to a 16-bit input port 54 of ALU 50. Thus, the 16-bit MSB of a floating-point mantissa are applied to the input ports of ALU 50. Output signals appearing at 16-bit output port 42 of register file 36 are divided into most significant bit (MSB) and least significant bit (LSB) portions. The MSB portions are applied over an 8-conductor set 56 to a first 8-bit input port 58 of an 8-bit ALU 60. The LSB portions of the signal appearing at output port 42 of register file 36 are applied over an 8-conductor set 62 to a first 8-bit input port 64 of an 8-bit ALU 66. The 16-bit signals appearing at output port 44 of register file 36 are divided into MSB and LSB portions, with the MSB portions being applied over an 8-conductor set 68 to a second 8-bit input port 70 of ALU 60, and the LSB being applied over an 8-conductor set 72 to a second 8-bit input port 74 of ALU 66. Thus, the eight least significant bits of the mantissa of a floating-point word are applied to the input ports of ALU 60, while the 8-bit mantissa bits are applied to the input ports of ALU 66.

Eight-bit ALU 66 also includes a carry output port 76 which is coupled by way of a controllable switch 78 to a carry input port 80 of ALU 60. While switch 78 is illustrated as a mechanical single-pole, double-throw switch, those of ordinary skill in the art know that solid-state equivalents are used in practice. ALU 60 also includes a carry output port 82 which is coupled by way of a controllable switch 84 to a carry input pot 86 of ALU 50. Switch 78 in the position illustrated couples carry output terminal 76 of ALU 66 to carry input terminal 80 of ALU 60, but in its alternate position (not illustrated) switch 78 decouples carry output terminal 76 from carry input terminal 80 and instead couples carry input terminal 80 to a terminal 88 to which logic low level (illustrated as ground) is applied. Similarly, controllable switch 84 in the position illustrated couples carry output terminal 82 of ALU 60 to carry input terminal 86 of ALU 50, but in its alternate position (not illustrated) decouples them and instead couples carry input port 86 to a logic low level (illustrated as ground) connected to a terminal 90. Switches 78 and 84 are controlled by a switch control circuit illustrated as a block 92. Switch control circuit 92 may be a simple decoder which receives signals over a conductor set 93 representative of the type of signal being processed during the circuit clock cycle. Switch control circuit 92 decodes the signal and places switches 78 and 84 in the proper positions, as described below.

Sixteen-bit ALU 50 produces its processed output signal at a 16-bit output port 94, which is coupled by a conductor set 96 to a second input port 98 of multiplexer 18. The signal produced by 8-bit ALU 60 is produced at an 8-bit output port 98 and is coupled to an MSB 8-conductor set 100. Similarly, the 8-bit output signal of ALU 66 is produced at an 8-bit output port 102 and is coupled onto an LSB 8-conductor set 104. Conductor sets 100 and 104 merge to form a 16-conductor set 106 which is coupled to a second input port 108 of multiplexer 24.

In operation with a 32-bit input signal, the MSB of which are applied to input port 10 and the LSB of which are applied to input port 12, 32-bit bit operation is accomplished in three clock cycles. The first clock cycle is used to load the first 32-bit word into the register file from input ports 10 and 12, and the second clock cycle is used to load the second 32-bit word into the register file. With both 32-bit words stored, the third clock cycle can be used for processing the words by the three ALUs 50, 60 and 66, connected as one 32-bit ALU by the illustrated position of switches 78 and 80. The processed words can be recirculated to register file 36 for further processing by way of the second inputs of multiplexers 18 and 24. Naturally, during ongoing operations continuous loading and processing takes place, and the clock cycles required for loading occur concurrently with the clock cycles used for processing. An output may therefore be available during each clock interval. The 32-bit output can conveniently be taken from conductor sets 96 and 106, as illustrated by dashed lines 110 and 112 connected to 16-bit output ports 111 and 113, respectively.

In order to operate with independent 16-bit inputs, the first independent 16-bit input word is applied to input terminal 10 concurrently with application of the second independent 16-bit input word to input port 12, and the two words are stored simultaneously in register file 36 in response to the first clock cycle. During the second clock cycle, 16-bit ALU 50 may process the data independently of ALUs 60 and 66, or 8-bit ALUs 60 and 66 may process the signal together independently of ALU 50. Independence of ALU 50 from ALUs 60 and 66 in accomplished by throwing switch 84 to its open position, i.e. to the alternate position (not illustrated), in which terminal 86 is coupled to ground.

Processing of four 16-bit single-precision words may be accomplished by (a) during a first clock cycle applying the first of two 16-bit words to register file 36 by way of input port 10 and multiplexer 18, and the second by input port 12 and multiplexer 24, and (b) during a second clock cycle applying a third 16-bit word to register file 36 by way of port 10 and multiplexer 18, and a fourth 16-bit word by way of port 12 and multiplexer 24. On the third clock cycle, ALU 50 independently processes the first and third 16-bit words applied to its first (48) and second (54) input ports from ports 38 and 40 of register file 36, and ALUs 60 and 66 together independently process the second and fourth 16-bit works applied to their inputs from output ports 42 and 44 of register file 36. As in the aase of double-precision processing, continuous operation includes loading and processing during each clock cycle.

Switch 84 may be opened at any time prior to or at the time that the output produced at output port 94 (or 98, 102) is applied to a storage element, as for example by recirculation through multiplexer 18 to register file 36, or application of an output by way of conductor set 110 to a utilization apparatus. With switch 84 open, 16-bit ALU 50 operates independently of ALUs 60 and 66. With switch 78 closed, however, the carry output of ALU 66 is coupled to the carry input 80 of ALU 60, whereby the two 8-bit ALUs together form a single 16-bit ALU which is independent of 16-bit ALU 50. Consequently, the 16-bit signal originally applied by way of input port 12 and multiplexer 24 to register file 36 has its LSB portions processed by 8-bit ALU 86 and the MSB portions, together with the carry output of 8-bit ALU 66, processed by 8-bit ALU 60. Two independent processed outputs are independently generated on conductor sets 96 and 106 and are available for recirculation or for direct outputs as mentioned above.

When performing operations on two 32-bit symbols, each in the form of a 24-bit mantissa together with an 8-bit exponent, each symbol is treated as an independent 32-bit word including 24-bit mantissa divided into first 16-bit MSB word and 8-bit LSB portion, with the 8-bit exponent associated with the 8-bit LSB mantissa portion in a second 16-bit word. The two resulting 16-bit words of each symbol are loaded into register 36 during one clock interval, whereupon loading of two such 32-bit symbols requires two clock cycles. The 24-bit mantissas are applied from ports 38, 40 and from the MSB portions of ports 42 and 44 of register file 36 to both input ports of 16-bit ALU 50 and to both input ports of 8-bit ALU 60. The 8-bit exponent is applied from the LSB portions of output ports 44 and 42 of register file 36 to both input ports 62 and 74 of 8-bit ALU 66. At some time before the results of processing by the ALUs is completed, switch 84 is closed and switch 78 is opened. With switch 78 open, ALU 66 operates independently of the other two, and 8-bit ALU 60 acts in conjunction with 16-bit ALU 50 as a 24-bit ALU . The 24-bit mantissa portion of the symbols are processed by the 24-bit ALU combination, and the 8-bit mantissa portions are processed by 8-bit ALU 66. Thus, processing of the floating-point signal can be completed within one clock cycle, as with processing of simple 32-bit (double precision) and pairs of 16-bit (single precision) words.

Switches 78 and 84 may be left open, thereby allowing independent operation of 16-bit ALU 50, 8-bit ALU 60 and 8-bit ALU 66 independent of each other.

Figure 2:
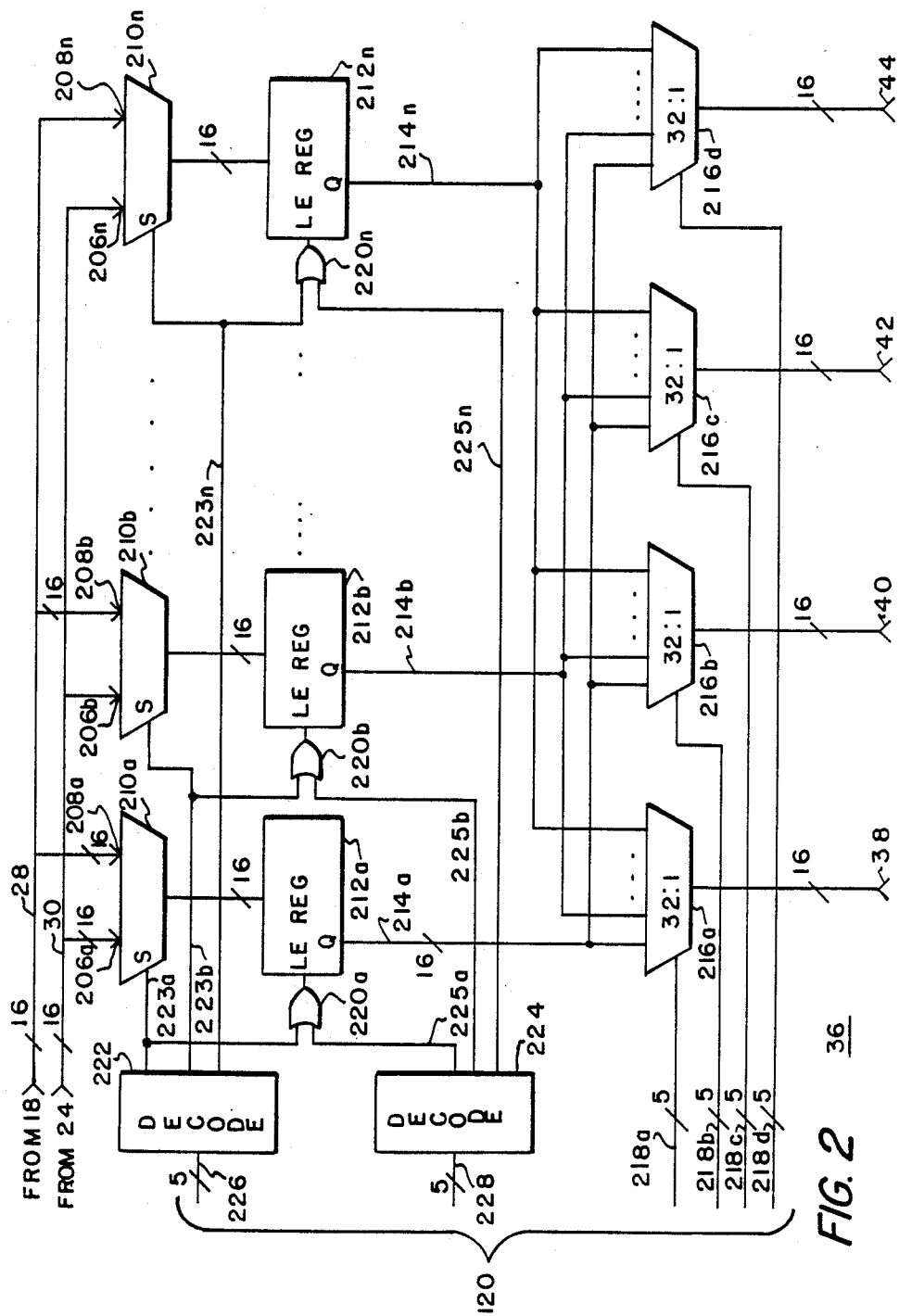
FIG. 2 is a block diagram of a register portion of the register file of FIG. 1.

FIG. 2 is a block diagram of register file 36. Elements of FIG. 2 corresponding to those of FIG. 1 are designated by the same reference numerals. In FIG. 2, 16-conductor set 28 is applied in parallel to 16-bit first input ports 208a, 208b . . . 208n of thirty-two multiplexers 210a, 210b . . . 210n, respectively. Similarly, 16-conductor set 30 is applied in parallel to the 16-bit second input ports 206a, 206b . . . 206n of multiplexers 210a, 210b . . . 210n, respectively. The 16-bit output ports of multiplexers 210 are applied to 16-bit input ports of thirty-two 16-bit registers 212a, 212b. . . 212n, respectively. The 16-bit word loaded into any one of registers 212 appears at all times on its 16-bit output conductor set 214a, 214b . . . 214n. The output conductor set 214 of each of registers 212 is applied simultaneously to one of the thirty-two 16-bit input ports of each of multiplexers 216a, 216b, 216c and 216d. The 16-bit output conductor set of multiplexer 216a is coupled to 16-bit output port 38 of register file 36. The output of multiplexer 216b is coupled to 16-bit output port 40, the output of multiplexer 216c is coupled to output port 42, and the output of multiplexer 216d is coupled to output port 44.

Each 32:1 multiplexer 216 is controlled by 5-bit control signals applied over a corresponding conductor set 218a–d, which is a portion of control conductor set 218. Thus, for example, as illustrated in FIG. 2, multiplexer 216a couples to its output conductor set and to output port 38 the signal applied to a selected one of its thirty-two 16-bit inputs, under the control of the 5-bit selection signal applied thereto over conductor set 218a. This arrangement allows the 16-bit word stored in any one of registers 212 to be coupled to any one of output ports 38, 40, 42 or 44, and allows simultaneous selection of the 16-bit words stored in any four of registers 212 for application to output ports 38–44.

Each multiplexer 210 couples to its output conductor set and to the input port of the corresponding register 212 the signal applied to its first input port from conductor set 28 when its select (S) input terminal is in a particular logic state, as for example a logic low state. More specifically, when the S input of any multiplexer 210 is in a logic high condition, that multiplexer 210 couples to its output conductor set and to the associated register 212 the signal applied to its second input port 206 from conductor set 30. When the S input of a multiplexer 210 is at logic low level, that multiplexer couples to its output conductor set the signal applied to its first input port from conductor set 28.

Each register 212 includes a load enable (LE) input terminal. Each register 212a, 212b . . . 212n is associated with an OR gate 220a, 220b . . . 220n, respectively. The output of each OR gate 220 is coupled to the LE input of the associated register 212. Each OR gate 220 includes two input terminals, one of which is connected to one of 32 single-conductor output conductors or lines 223 from a one-of-32 decoder 222. The other input terminal of each OR gate 220 is connected to one of the single-conductor output lines 225 of a second one-of-32 decoder 224. Thus, the 32 output conductors 225 of decoder 224 are applied individually to inputs of 32 separate OR gates 220. The output conductors 223 of decoder 222 are similarly connected to the second inputs of OR gates 220 and are also connected to the S inputs of the associated multiplexers 210. As a specific example, OR gate 220a has its output connected to the LE input terminal of register 212a, which is arranged to receive 16-bit signals from multiplexer 210a. An output conductor 223a of one-of-32 decoder 222 is connected to the S input of multiplexer 210a and to an input of OR gate 220a. OR gate 220a is also connected to one-of-32 decoders 224 output selection conductor 225a.

Decoder 222 receives a 5-bit control signal from a conductor set 226, and decoder 224 receives a 5-bit control signal over a conductor set 228. The control signal applied to decoder 222 over conductor set 226 causes one of its 31 output lines 223 to assume a logic high condition, thereby enabling one of the 31 registers 212 for writing into storage, and controlling the associated multiplexer 210 to couple the signal from conductor set 30 to that register for writing or loading. When so enabled by a logic high condition at the LE input, the next clock pulse (clock pulses and connections not illustrated) causes writing into the register selected by decoder 222 of data from conductor set 30. The 5-bit control signal applied over conductor set 228 to decoder 224 can simultaneously select any other single register for loading from conductor set 28. Thus, the 5-bit signal on conductor set 228 causes one of the 32 output conductors 225 of decodes 224 to select a register 212 to be enabled by way of its associated OR gate 220. Since the output conductors of decoder 224 are not coupled to the S input terminal of the associated multiplexers, the multiplexers associated with the registers 212 selected by decoder 224 couple to the selected register signals originating from conductor set 28. The same clock pulse which causes clocking into the register selected by decoder 222 also causes clocking into the register selected by decoder 224. A simple way of viewing this portion of the operation is to consider that a signal applied to conductor set 226 selects a register to be loaded (at the next clock pulse) from conductor set 30, and a signal applied to conductor set 228 selects a register to be similarly loaded from conductor set 28.

The exact manner of control of switches 78 and 84 (FIG. 1) will depend upon the types of data being processed from moment to moment, which as described above may be either single precision, double precision or floating-point in a particular clock cycle and will also depend upon the type of processing being accomplished. The control will be apparent to those of ordinary skill in the art, as will the control signals applied over conductor set 120 to cause the signals to arrive at the proper ports of the ALU. Similarly, the control of multiplexers 18 and 24 depends upon when new words are to be loaded, and whether recirculation of data is required, which depends upon the particular application of the arrangement.

Other embodiments of the invention will be apparent to those skilled in the art. For example, the system output may be taken from output ports 38, 40, 42 and 44 of the register file instead of by way of output conductors 110, 112 (FIG. 1).

In general, different numbers of bits may be used per word. The general requirement is if single-precession processing uses $N_1$ bits, and floating-point processing uses an $N_3$ - bit exponent, then the double-precision processing is accomplished by $N_1+N_2+N_3$ bit words, where $N_2$ is the difference between $N_1$ and $N_3$.

What is claimed is:

1. An arrangement for processing 2N-bit data produced at first and second N-bit source ports, which data is configurable in the form of a 2N-bit word or two N-bit words or a word including 3N/2-bit mantissa with N/2-bit exponent, comprising:

an N-bit register file including first and second N-bit input ports and first, second, third, fourth, fifth and sixth output ports, said first and second output ports having N bits, said third and fourth output ports each having N/2 bits which together constitute one N-bit output port, with said third output port representing the most significant of said N bits, and said fourth output port representing the remaining bits of lesser significance, said fifth and sixth output ports each having N/2 bits, which together constitute one N-bit output port, with said fifth output port representing the most significant bits, and said sixth output port representing the remaining bits of lesser significance;

a dynamically reconfigurable arithmetic logic unit including first and second input ports coupled to a first portion of said arithmetic logic unit, said first and second input ports of said first portion of said arithmetic logic unit each having N bits and being coupled to said first and second output ports of said register file, respectively, said first portion of said arithmetic logic unit further including a carry input terminal and an N-bit output port, said reconfigurable arithmetic logic unit further including third and fourth input ports coupled to a second portion of said arithmetic logic unit, said second portion of said arithmetic logic unit further including a carry input terminal, a carry output terminal, and an N/2 bit output port, said third input port of said arithmetic logic unit having N/2 bits and being coupled to said third output port of said register file, said fourth input port of said arithmetic logic unit having N/2 bits and being coupled to said fifth output port of said register file, said reconfigurable arithmetic logic unit further including fifth and sixth input ports coupled to a third portion of said arithmetic logic unit, said third portion of said arithmetic logic unit further including a carry output terminal and an N/2 bit output port, said fifth input port of said arithmetic logic unit having N/2 bits and being coupled to said fourth output port of said register file, and said sixth input port of said arithmetic logic unit having N/2 bits and being coupled to said sixth output port of said register file, said reconfigurable arithmetic logic unit further including first and second controllable switch means, said first switch means including a controllable path coupled to said carry output terminal of said second portion of said arithmetic logic unit and to said carry input terminal of said first portion of said arithmetic logic unit, said second switch means including a controllable path coupled to said carry output terminal of said third portion of said arithmetic logic unit and to said carry input terminal of said second portion of said arithmetic logic unit, said first and second switch means each further including control input terminals;

coupling means coupled to said first and second N-bit input port of said register file and adapted to be coupled to said first and second N-bit source ports for coupling data from said first and second source ports to said first and second input ports of said register file, respectively;

switch control means coupled to said first and second switch means for controlling said switch means in first, second and third operating modes, said first operating mode having said first and second switch means closed for thereby operating said first, second and third portions of said arithmetic logic unit together as a 2N-bit arithmetic logic unit, said second operating mode having said first switch means open and said second switch means closed for thereby operating said first portion of said arithmetic logic unit independently and for operating said second and third portions of said arithmetic logic unit together as an N-bit portion, said third operating mode having said first switch means closed and said second switch means open for thereby forming a 3N/2 bit portion of said arithmetic logic unit including said first and second portions of said arithmetic logic unit together with a separate N/2 bit portion including said third portion of said arithmetic logic unit.

2. An arrangement according to claim 1 wherein N is sixteen, and N/2 is eight.

3. An arrangement according to claim 1, wherein said coupling means comprises:

first multiplexing means including first and second N-bit input ports and an N-bit output port, and further including a control input port, said output port of said first multiplexing means being coupled to said first input port of said register file, said first input port of said first multiplexing means being coupled to said output port of said first portion of said arithmetic logic unit, and said second input port of said first multiplexing means being adapted to be coupled to said first source port;

second multiplexing means including first and second N-bit input ports and an N-bit output port divided into MSB and LSB portions, and further including a control input port, said output port of said second multiplexing means being coupled to said second input port of said register file, said MSB portion of said first input port of said second multiplexing means being coupled to said output port of said second portion of said arithmetic logic unit, and said LSB portion of said first input port of said second multiplexing means being coupled to said output port of said third portion of said arithmetic logic unit, said second input port of said second multiplexing means being adapted to be coupled to said second source port;

multiplex control means coupled to said first and second multiplexing means for operating said first and second multiplexing means together in one of a first nonfeedback operating mode and a second feedback operating mode, said first operating mode coupling said second ports of said multiplexing means to receive data from said source ports and coupling said output ports of said first and second multiplexing means to said first and second input ports of said register file for loading said register file with data to be processed and for decoupling said output ports of said first, second and third portions of said arithmetic logic unit from said input ports of said register file, and said second mode decoupling said source ports from said input ports of said register file and coupling said output port of said first portion of said arithmetic logic unit to said first port of said register file and said output ports of said second and third portions of said arithmetic logic unit to said MSB and said LSB portions, respectively, of said second input port of said register file, for thereby allowing recurrent passes through said arithmetic logic unit.

4. An arrangement according to claim 1 wherein said switch control means further controls said switch means in a fourth operating mode, said fourth operating mode having both said first and second switch means open for operating said first, second and third portions of said arithmetic logic unit independently.

5. A reconfigurable processor, comprising:
a first ALU including first, second and output N-bit ports and a carry input terminal;
a second ALU including first, second and output N/2-ports, carry input and output terminals;
a third ALU including first, second and output N/2-bit ports, and a carry output terminal;
controllable coupling means coupled to said carry input terminals of said first and second ALUs and to said carry output terminals of said second and third ALUs for selectively coupling said carry output terminal of said third ALU to said carry input terminal of said second AL and said carry output terminal of said second ALU to said carry input of said first ALU;
means for applying (a), in a first mode of operation, the N-bit MSB of a first 2N-bit word to said first input port of said first ALU and the N-bit MSB of a second 2N-bit word to said second input port of said first ALU, and the N/2-bit LSB of said first 2N-bit word to said first input port of said third ALU and the N/2-bit LSB of said second 2N-bit word to said second input port of said third ALU, and the remaining N/2 bits of said first 2N-bit word to said first input port of said second ALU and the remaining N/2 bits of said second 2N-bit word to said second input port of said second ALU, (b) in a second mode of operation, a first N-bit word to said first input port of said first ALU and a second N-bit word to said second input port of said first ALU, and the N/2 most significant bits of a third N-bit word to said first input port of said second ALU and the N/2 most significant bits of a fourth N-bit word to said second input port of said second ALU, and the N/2 least significant bits of said third N-bit word to said first input port of said third ALU and the N/2 least significant bits of said fourth N-bit word to the second input port of said third ALU, (c) in a third mode of operation, the N most significant bits of 3N/2-bit mantissa of a first floating-point word to said first input port of said first ALU and the N most significant bits of the 3N/2-bit mantissa of a second floating-point word to said second port of said first ALU, and the N/2-bit least significant bits of said 3N/2-bit mantissa of said first floating-point word to said first input port of said second ALU, and the N/2 least significant bits of said second floating-point word to said second input port of said second ALU, and the N/2-bit exponent of said first floating-point word to said first input port of said third ALU, and the N/2-bit exponent of said second floating-point word to said second input port of said third ALU; and
means for controlling said controllable coupling means for, (a) in said first mode of operation, coupling said carry output terminal of said third ALU to said carry input terminal of said second ALU and said carry output terminal of said second ALU to said carry input terminal of said first ALU, (b) in said second mode of operation, decoupling said carry output terminal of said second ALU from said carry input terminal of said first ALU and coupling said carry output terminal of said third ALU to said carry input terminal of said second ALU, and (c) in said third mode of operations coupling said carry output terminal of said second ALU to said carry input terminal of said first ALU and decoupling said carry output terminal of said third ALU from said carry input terminal of said second ALU.

6. An arrangement for processing data having a number of bits equal to N1+N2+N3, which data is produced at an N1-bit first source port and an (N2+N3)-bit second source ports, and which data is configurable in the form of an N1+N2+N3 - bit word, or two N1 - bit words, or a word including an (N1+N2) bit mantissa with N3 - bit exponent, comprising:
an N1 - bit register file including a first N1-bit input port and a second (N2+N3)-bit input port and first, second, third, fourth, fifth and sixth output ports, said first and second output ports each having N1 bits, said third and fourth output ports having N2 and N3 bits, respectively, which together constitute one output port, with said third output port representing the most significant of said N2+N3 bits, and said fourth output port representing the remaining bits of lesser significance, said fifth and sixth output ports having N2 and N3 bits, respectively, which together constitute one output port, with said fifth output port representing the most significant bits, and said sixth output port representing the remaining bits of lesser significance;
a dynamically reconfigurable arithmetic logic unit including first and second input ports coupled to a first portion of said arithmetic logic unit, said first and second input ports of said first portion of said arithmetic logic unit each having N1 bits and being coupled to said first and second output ports of said register file, respectively, said first portion of said arithmetic logic unit further including a carry input terminal and an N1-bit output port, said reconfigurable arithmetic logic unit further including third and fourth input ports coupled to a second portion of said arithmetic logic unit, said second portion of said arithmetic logic unit further including a carry input terminal, a carry output terminal, and an N2-bit output port, said third input port of said arithmetic logic unit having N2 bits and being coupled to said third output port of said register file, said fourth input port of said arithmetic logic unit having N2 bits and being coupled to said fifth output port of said register file, said reconfigurable arithmetic logic unit further including fifth and sixth input ports coupled to a third portion of said arithmetic logic unit, said third portion of said arithmetic logic unit further including a carry output terminal and an N3 - bit output port, said fifth input port of said arithmetic logic unit having N3 bits and being coupled to said fourth output port of said register file, and said sixth input port of said arithmetic logic unit having N3 bits and being coupled to said sixth output port of said register file, said reconfigurable arithmetic logic unit further including first and second controllable switch means, said first switch means including a controllable path coupled to said carry output terminal of said second portion of said arithmetic logic unit and to said carry input terminal of said first portion of said arithmetic logic unit, said second switch means including a controllable path coupled to said carry output terminal of said third portion of said arithmetic logic unit and to said carry input terminal of said second portion of said arithmetic logic unit, said first and second switch means each further including control input terminals;

coupling means coupled to said first and second input ports of said register file and adapted to be coupled to said first and second source ports for coupling data from said first and second source ports to said first and second input ports of said register file, respectively;

switch control means coupled to said first and second switch means for controlling said switch means in at least first, second and third operating modes, said first operating mode having said first and second switch means closed for thereby operating said first, second and third portions of said arithmetic logic unit together as an (N1+N2+N3) - bit arithmetic logic unit, said second operating mode having said first switch means open and said second switch means closed for thereby operating said first portion of said arithmetic logic unit independently and for operating said second and third portions of said arithmetic logic unit together as an (N2+N3) - bit portion, said third operating mode having said first switch means closed and said second switch means open for thereby forming an (N1+N2) - bit portion of said arithmetic logic unit including said first and second portions of said arithmetic logic unit together with a separate N3 - bit portion including said third portion of said arithmetic logic unit.

7. An arrangement according to claim 6 wherein N1=N2+N3.

8. An arrangement according to claim 7 wherein N1 is sixteen, N2 is eight, and N3 is eight.

9. An arrangement according to claim 6 wherein N2=N3.

10. An arrangement according to claim 6 wherein said switch control means further controls said switch means in a fourth operating mode, said fourth operating mode having both said first and second switch means open for operating said first, second and third portions of said arithmetic logic unit independently.

* * * * *